(No Model.)
A. WEBER.
STEAM TRAP AND REGULATOR.
No. 403,162. Patented May 14, 1889.
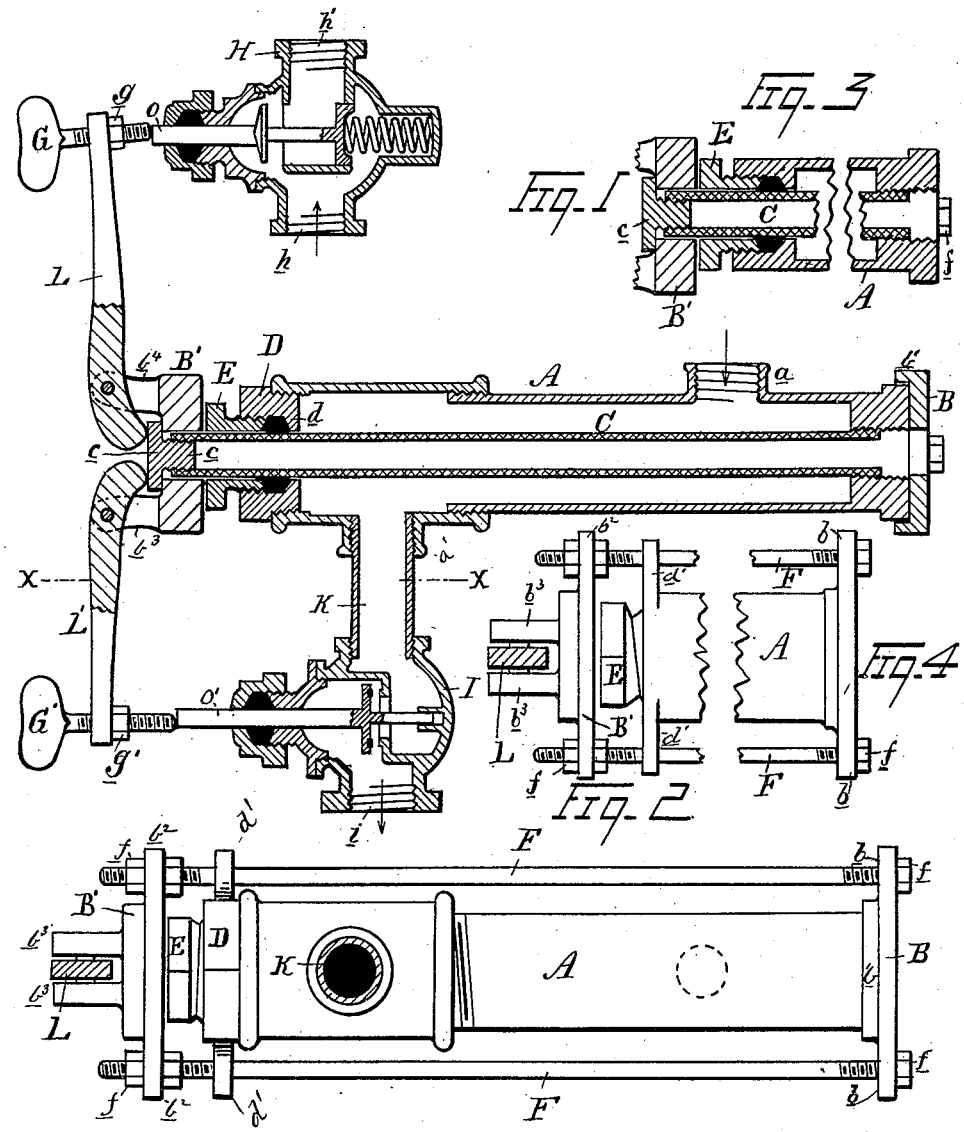
Witnesses:
John Schuman.
M. E. Hunt.
Inventor:
Adolph Weber.
by Charles J. Hunt
Att'y

UNITED STATES PATENT OFFICE.

ADOLPH WEBER, OF DETROIT, MICHIGAN, ASSIGNOR OF ONE-HALF TO WILLIAM L'E. MAHON, OF SAME PLACE.

STEAM TRAP AND REGULATOR.

SPECIFICATION forming part of Letters Patent No. 403,162, dated May 14, 1889.

Application filed January 11, 1889. Serial No. 296,112. (No model.)

*To all whom it may concern:*

Be it known that I, ADOLPH WEBER, of Detroit, in the county of Wayne and State of Michigan, have invented new and useful Improvements in Steam Traps and Regulators; and I hereby declare that the following is a full, clear, and exact description thereof, reference being had to the accompanying drawings, which form a part of this specification.

My invention relates to that class of steam traps and regulators in which the opening of the valves for the passage of the steam and the water of condensation are governed by the expansion of a thermostatic tube or rod and regulated on the outside; and it consists in the means by which the expansion of a thermostatic tube or rod closes the valves of the steam-regulator and the trap for the water of condensation, and in the means for regulating the extent of the opening of said valves, and the combination and arrangement of the parts, as hereinafter more particularly set forth. By means of my invention the supply of steam is governed and regulated by the same means as the trap for the discharge of the water of condensation, so that the amount of steam in the pipes when condensed will not be in excess of the discharge, and the opening of the valves through which the water is discharged will be so governed that it will be just sufficient for that purpose, so that there will be no backflow of the water in the pipes and the waste of steam prevented.

Figure 1 is a vertical section of my steam trap and regulator. Fig. 2 is a plan view, partially sectional, through the line $x\,x$ in Fig. 1. Fig. 3 is a sectional view of the cylinder in one piece, the ends integral with the cylinder, the central portion being broken out. Fig. 4 is a plan view of the same with the central portion broken out.

In the drawings, A represents a hollow iron cylinder, in which the thermostatic tube C is inclosed. This cylinder has on its upper side and near its outer end a nipple, $a$, into which is tapped a female screw-thread which receives the lower end of the main system of piping for heating purposes. On the lower side of the cylinder and near the other end is the nipple $a'$, into which is tapped a screw-thread, the pipe K connecting the cylinder to the water or waste valve. The outer end of the cylinder is solid, being cored and internally screw-threaded to receive the inner end of the brass tube C. This cylinder A may be made in one piece with solid ends, one end being cored and internally screw-threaded to receive the inner end of the brass tube C, and the other end cored for the passage of the tube C and for a stuffing-box on its outer face, the stuffing-box being internally screw-threaded for the reception of the gland E. The wings $b\,b$ and $d'\,d'$ are cast integral with the cylinder, and are perforated for the passage of the rods F F.

B is a cap on the outer end of the cylinder A, cored and provided with the annular flange $b'$, in which the end of the cylinder rests. Two wings $b\,b$ project from the opposite sides of the cap B, and are perforated for the passage of the rods F F. The other end of the cylinder A is internally screw-threaded for the reception of the screw-threaded annular flange on the inner face of the cap D.

$d'\,d'$ are wings projecting from the cap D, and are perforated for the passage of the rods F F. The cap D is cored for the passage of the brass tube C, and also to form a stuffing-box, $d$, on its outer face. This stuffing-box is also internally screw-threaded for the reception of the hollow gland E, which is externally screw-threaded and cored for the passage of the brass tube C.

B' is a cap, which is connected with the cylinder A by the rods F F, and is cored for the passage of the brass tube C. The cap B' is provided with wings $b^2\,b^2$, which are perforated to allow the insertion of the rods F F.

Four studs, $b^3\,b^3\,b^4\,b^4$, project from an annular flange on the outer face of the cap B', and are arranged in pairs—one pair on the upper side and one pair on the lower side of the cap.

F F are rods passing through the wings on the cylinder or caps and the cap B', and are screw-threaded at the ends, upon which are screwed the nuts $f\,f$. These rods and nuts form the connection between the cylinder A and the cap B', and regulate the extent of the action of the thermostatic tube C on the ends of the levers L L'. This brass tube at its inner end is screwed into the cored outer end of the cylinder A, and extends through the entire length of the cylinder and passes freely through the cap D, the stuffing-box $d$, the hollow gland E, and the cap B', and is closed at its outer end by the cap $c$, which is screwed into the tube, the other end being open to the air. A brass rod may be used in place of the tube, if desired.

L L' are levers slightly curved on their inner and shorter arms, where they are in contact with the cap $c$ on the brass tube C. These levers are pivoted at $l\ l'$ in the studs $b^3\ b^3\ b^4\ b^4$, projecting from the cap B'. Their outer and longer arms are provided with the thumb-screws G G' and nuts $g\ g'$.

The end of the thumb-screw G rests against the outer end of the smooth valve-stem O of the valve H, and actuates the same to close the valve. The valve H is a valve of the ordinary construction, having a pipe leading from the boiler inserted in the inlet-orifice $h$, and the end of the pipe of the main system of piping inserted in the exit-orifice $h'$. This valve is kept open by the spring under the valve-stem when not closed by the action of the lever L. The end of the thumb-screw G' rests against the smooth valve-stem O' of the valve I, and actuates the same in closing the valve.

The valve I is a globe-valve of any ordinary construction, and is below the cylinder A, with which it is connected by the pipe K, and has an outlet-orifice, $i$, into which is screwed a waste-pipe for the passage of the water of condensation.

Steam being admitted from the boiler, passes through the valve H into the main system of pipes. As these pipes are colder than the steam, the latter condenses rapidly and the water of condensation runs down through the cylinder A and out through the discharge or waste valve I. The weight of the water and the pressure of the steam keep this waste-valve open until it is closed by the action of the thermostatic tube on the lever L' and the thumb-screw G'. The water of condensation, being at first nearly of the temperature of the pipes, does not affect the thermostatic tube; but as the temperature of the pipes rises the water also becomes heated and heats the thermostatic tube, which begins to expand. As the tube expands, it presses against the lever L and through the thumb-screw G closes completely or partially the valve H, and cuts off the steam-supply. The temperature of the pipes being nearly that of the steam, the quantity of the water of condensation diminishes and a large opening is not needed for its discharge. The expansion of the theromstatic tube, which operates on the valve H through the lever L, also closes in the same manner and at the same time the waste-valve I by its action on the lever L' and thumb-screw G'. Thus, when the steam is freely admitted to the pipes and the amount of condensation is large, the orifice for the discharge of the water is sufficient to allow it all to flow off. As the temperature of the pipes increases, the amount of steam is decreased, the condensation is lessened, and the orifice for the discharge or waste is proportionally diminished. The expansion of the iron cylinder causes the pipe K and the valve I to move toward the outer end of the lever L', and thus assists in closing this valve. By this construction and connection of the steam trap and regulator I am enabled to take advantage of the expansion of both the brass tube and of the iron cylinder, thus using the total expansion of the two and not the differential expansion in closing this valve I.

By means of the thumb-screws the extent of the opening of the valves can be easily changed when necessary and the supply of steam regulated.

What I claim as my invention is—

1. The combination of the iron cylinder A, provided with the inlet and outlet pipes and the wings $b$ and $d'$, the gland E, the cap B', having wings $b^2$ and provided with the studs $b^3\ b^3$ and $b^4\ b^4$, the rods F F, with the nuts $f\ f$, for connecting the cap B' with the cylinder and for regulating the extent of the action of the thermostatic tube C, the thermostatic tube C, the lever L, operated by the thermostatic tube, the means for controlling the extent of the opening of the valve H, and the valve H, substantially as and for the purpose described.

2. The combination of the iron cylinder A, provided with inlet and outlet passages and wings $b\ d'$, the gland E, the cap B', having wings $b^2$ and provided with the studs $b^3\ b^3$ and $b^4\ b^4$, the rods F F, and nuts for connecting the cap B' with the cylinder A and for regulating the extent of the action of the thermostatic tube C, the thermostatic tube C, the lever L', the means for regulating the extent of the opening of the valve I, the valve I, and the pipe K, substantially as and for the purpose described.

3. The combination of the iron cylinder A, provided with the inlet and outlet pipes and the wings $b\ d'$, the gland E, the cap B', having wings $b^2\ b^2$ and provided with the studs $b^3\ b^4$, the rods and nuts for connecting the cap B' with the cylinder and for regulating the extent of the action of the thermostatic tube C, the thermostatic tube C, the levers L L', the means for regulating the extent of the opening of the valves H and I, the valves H and I, and the tube K, substantially as and for the purpose set forth.

ADOLPH WEBER.

Witnesses:
BENJ. NOBLE,
J. L. BOND.